United States Patent
Braun et al.

(10) Patent No.: US 7,447,604 B2
(45) Date of Patent: Nov. 4, 2008

(54) METHOD AND APPARATUS FOR COMPENSATING FOR POSITION SLIP IN INTERFACE DEVICES

(75) Inventors: Adam C. Braun, Sunnyvale, CA (US); Kollin M. Tierling, Campbell, CA (US); Kenneth M. Martin, Palo Alto, CA (US); Bruce M. Schena, Menlo Park, CA (US)

(73) Assignee: Immersion Corporation, San Jose, CA (US)

( * ) Notice: Subject to any disclaimer, the term of this patent is extended or adjusted under 35 U.S.C. 154(b) by 639 days.

(21) Appl. No.: 10/995,586

(22) Filed: Nov. 23, 2004

(65) Prior Publication Data

US 2005/0088408 A1    Apr. 28, 2005

Related U.S. Application Data

(63) Continuation of application No. 09/570,157, filed on May 11, 2000, now Pat. No. 6,903,721.

(60) Provisional application No. 60/133,586, filed on May 11, 1999.

(51) Int. Cl.
*G06F 19/00* (2006.01)
(52) U.S. Cl. ......................... 702/94; 701/211
(58) Field of Classification Search .................. 702/94, 702/182–185; 701/207, 211
See application file for complete search history.

(56) References Cited

U.S. PATENT DOCUMENTS

| | | | |
|---|---|---|---|
| 3,832,895 A | 9/1974 | Strandh | 73/133 |
| 3,919,691 A | 11/1975 | Noll | 340/172.5 |
| 4,103,155 A | 7/1978 | Clark | 250/231 |
| 4,148,014 A | 4/1979 | Burson | 340/709 |
| 4,398,889 A | 8/1983 | Lam et al. | 434/45 |
| 4,477,043 A | 10/1984 | Repperger | 244/223 |

(Continued)

FOREIGN PATENT DOCUMENTS

EP        0085518 A1        8/1983

(Continued)

OTHER PUBLICATIONS

Helmers, C., In the Beginning, Robotics Age magazine, Hayden Book Co., 1983, pp. 12-19.

(Continued)

*Primary Examiner*—Edward Raymond
(74) *Attorney, Agent, or Firm*—Kilpatrick Stockton LLP

(57) ABSTRACT

Method and apparatus for compensating for position slip in interface devices that may occur between a manipulandum and a sensor of the device due to a mechanical transmission. A device position delta is determined from a sensed position of a manipulandum of an interface device. It is determined if position slip has occurred caused by a change in position of the manipulandum that was not sensed by a sensor of the interface device, typically caused by a mechanical transmission between sensor and manipulandum. If position slip has occurred, an error in the sensed position caused by the position slip is corrected by adjusting the sensed position to take into account the position slip. The adjusted position delta is used as the position of the manipulandum and the display of objects controlled by the interface device are accordingly compensated.

7 Claims, 6 Drawing Sheets

U.S. PATENT DOCUMENTS

| | | | |
|---|---|---|---|
| 4,560,983 A | 12/1985 | Williams | 340/825 |
| 4,637,264 A | 1/1987 | Takahashi et al. | 73/862 |
| 4,678,908 A | 7/1987 | LaPlante | 250/231 |
| 4,689,449 A | 8/1987 | Rosen | 200/6 |
| 4,692,756 A | 9/1987 | Clark | 340/709 |
| 4,696,445 A | 9/1987 | Wright et al. | 244/229 |
| 4,706,294 A | 11/1987 | Ouchida | 381/109 |
| 4,712,101 A | 12/1987 | Culver | 340/710 |
| 4,712,971 A | 12/1987 | Fyler | 414/744 |
| 4,767,923 A | 8/1988 | Yuasa | 250/221 |
| 4,794,384 A | 12/1988 | Jackson | 340/710 |
| 4,800,721 A | 1/1989 | Cemenska et al. | 60/393 |
| 4,823,634 A | 4/1989 | Culver | 74/471 |
| 4,825,157 A | 4/1989 | Mikan | 324/208 |
| 4,861,269 A | 8/1989 | Meenen, Jr. | 434/45 |
| 4,868,549 A | 9/1989 | Affinito et al. | 340/710 |
| 4,906,843 A | 3/1990 | Jones et al. | 250/221 |
| 4,949,119 A | 8/1990 | Moncrief et al. | 364/578 |
| 5,006,703 A | 4/1991 | Shikunami et al. | 250/231 |
| 5,044,956 A | 9/1991 | Behensky et al. | 434/45 |
| 5,065,145 A | 11/1991 | Purcell | 340/706 |
| 5,086,401 A | 2/1992 | Glassman et al. | 395/94 |
| 5,103,404 A | 4/1992 | McIntosh | 318/568.22 |
| 5,138,154 A | 8/1992 | Hotelling | 250/231 |
| 5,146,566 A | 9/1992 | Hollis, Jr. | 395/275 |
| 5,159,990 A * | 11/1992 | Abe et al. | 180/197 |
| 5,184,319 A | 2/1993 | Kramer | 364/806 |
| 5,193,963 A | 3/1993 | McAffee et al. | 414/5 |
| 5,197,003 A | 3/1993 | Moncrief et al. | 364/410 |
| 5,204,600 A | 4/1993 | Kahkoska | 318/602 |
| 5,209,131 A | 5/1993 | Baxter | 73/865 |
| 5,209,661 A | 5/1993 | Hildreth et al. | 434/45 |
| 5,228,356 A | 7/1993 | Chuang | 74/471 |
| 5,254,919 A | 10/1993 | Bridges et al. | 318/560 |
| 5,264,768 A | 11/1993 | Gregory et al. | 318/561 |
| 5,327,790 A | 7/1994 | Levin et al. | 73/862.325 |
| 5,402,680 A | 4/1995 | Korenaga | 73/518 |
| 5,436,638 A | 7/1995 | Bolas et al. | 345/156 |
| 5,473,344 A | 12/1995 | Bacon et al. | 345/163 |
| 5,477,237 A | 12/1995 | Parks | 345/156 |
| 5,491,477 A | 2/1996 | Clark et al. | 341/20 |
| 5,532,585 A | 7/1996 | Oudet et al. | 324/207.22 |
| 5,576,704 A | 11/1996 | Baker et al. | 341/20 |
| 5,583,407 A | 12/1996 | Yamaguchi | 318/551 |
| 5,587,937 A | 12/1996 | Massie et al. | 364/578 |
| 5,589,828 A | 12/1996 | Armstrong | 341/20 |
| 5,591,924 A | 1/1997 | Hilton | 73/862.042 |
| 5,592,401 A | 1/1997 | Kramer | 364/550 |
| 5,611,731 A | 3/1997 | Bouton et al. | 463/37 |
| 5,629,594 A | 5/1997 | Jacobus et al. | 318/568.11 |
| 5,642,469 A | 6/1997 | Hannaford | 395/99 |
| 5,643,087 A | 7/1997 | Marcus et al. | 463/38 |
| 5,687,080 A | 11/1997 | Hoyt et al. | 364/190 |
| 5,694,153 A | 12/1997 | Aoyagi et al. | 345/161 |
| 5,701,140 A | 12/1997 | Rosenberg et al. | 345/156 |
| 5,712,725 A | 1/1998 | Faltermeier et al. | 359/392 |
| 5,724,068 A | 3/1998 | Sanchez et al. | 345/161 |
| 5,724,264 A | 3/1998 | Rosenberg et al. | 364/559 |
| 5,734,373 A | 3/1998 | Rosenberg et al. | 345/161 |
| 5,742,278 A | 4/1998 | Chen | 345/156 |
| 5,749,577 A | 5/1998 | Couch et al. | 273/148 |
| 5,755,577 A | 5/1998 | Gillio | 434/262 |
| 5,760,764 A | 6/1998 | Martinelli | 345/160 |
| 5,763,874 A | 6/1998 | Luciano et al. | 250/231.14 |
| 5,767,839 A | 6/1998 | Rosenberg | 345/161 |
| 5,790,108 A | 8/1998 | Salcudean et al. | 345/184 |
| 5,805,140 A | 9/1998 | Rosenberg et al. | 345/161 |
| 5,821,920 A | 10/1998 | Rosenberg et al. | 345/156 |
| 5,825,308 A | 10/1998 | Rosenberg | 341/20 |
| 5,841,428 A | 11/1998 | Jaeger et al. | 345/184 |
| 5,844,673 A | 12/1998 | Ivers | 356/138 |
| 5,889,670 A | 3/1999 | Schuler et al. | 364/188 |
| 5,907,487 A | 5/1999 | Rosenberg et al. | 364/190 |
| 5,912,661 A | 6/1999 | Siddiqui | 345/166 |
| 5,944,151 A | 8/1999 | Jakobs et al. | 188/267.1 |
| 5,984,785 A | 11/1999 | Takeda et al. | 463/38 |
| 5,990,869 A | 11/1999 | Kubica et al. | 345/163 |
| 6,001,014 A | 12/1999 | Ogata et al. | 463/37 |
| 6,004,134 A | 12/1999 | Marcus et al. | 434/45 |
| 6,020,876 A | 2/2000 | Rosenberg et al. | 345/157 |
| 6,031,222 A | 2/2000 | Carapelli | 250/231 |
| 6,067,077 A | 5/2000 | Martin et al. | 345/161 |
| 6,100,874 A | 8/2000 | Schena et al. | 345/157 |
| 6,104,379 A | 8/2000 | Petrich et al. | 345/157 |
| 6,104,382 A | 8/2000 | Martin et al. | 345/161 |
| 6,166,723 A | 12/2000 | Schena et al. | 345/184 |
| 6,219,034 B1 | 4/2001 | Elbing et al. | |
| 6,252,579 B1 | 6/2001 | Rosenberg et al. | 345/145 |
| 6,259,433 B1 | 7/2001 | Meyers | 345/161 |
| 6,275,213 B1 | 8/2001 | Tremblay et al. | 345/156 |

FOREIGN PATENT DOCUMENTS

| | | |
|---|---|---|
| EP | 0640902 A2 | 1/1995 |
| JP | 01-003664 | 7/1990 |
| JP | 02-109714 | 1/1992 |
| JP | 04-007371 | 8/1993 |
| JP | 05-193862 | 1/1995 |
| WO | 0626634 | 11/1994 |
| WO | WO9520788 | 8/1995 |

OTHER PUBLICATIONS

Hirota, Koichi et al., "Development of Surface Display," IEEE 0-7803-1363-1, 1993, pp. 256-262.

Russo, "The Design and Implementation of a Three Degree-of-Frredom Force Output Joystick", Submitted to the Department of Mechanical Engineering on May 11, 1990.

Ellis, R.E. et al., "Design and Evaluation of a High-Performance Prototype Planar Haptic Interface," ASME Dec. 3, 1993, DSC-vol. 49, pp. 55-64.

Jacobsen, S.C. et al., "High Performance, High Dexterity, Force Reflective Teleoperator II," ANS Topical on Robotics and Remote Systems, Feb. 24-27, 1991, pp. 1-10 and pp. 1-5 apndx.

Adelstein, B. et al., "Design and Implementation of a Force Reflecting Manipulandurn for Manual Control Research," Dept. of Mech. Engineering, MIT, 1992, pp. 1-24.

Hasser, C., "Tactile Feedback for a Force-Reflecting Haptic Display", Univ. of Dayton, Dayton OH, 1995, pp. 1-96.

Rosenberg et al., "Commercially Viable Force Feedback Controller for Individuals with Neuromotor Disabilities," USAF Armstrong Lab. AL/CF-TR-1997-0016,1996, pp. 1-33.

Akamatsu, M., et al., "Multimodal Mouse: A Mouse-Type Device with Tactile and Force Display", Presence, vol. 3, No. 1, Winter 1994, pp. 73-80.

Ramstein, C., "Combining Haptic and Braille Technologies: Design Issues and Pilot Study," Assets '96, 2nd Annual ACM Conf. on Assistive Technologies, 1996, pp. 37-44.

Kelley, A.J. et al., "MagicMouse: Tactile and Kinesthetic Feedback in the Human-Computer Interface using an Electromagnetically Actuated Input/Output Device," Dept. of Elec. Engineering, Univ. of British Columbia, 1993, pp. 1-27.

Schmult, Brian et al., "Application Areas for a Force-Feedback Joystick," ASME 1993, DSC-vol. 49, pp. 47-54.

Colgate, J. et al., "Implementation of Stiff Virtual Walls in Force-Reflecting Interfaces," Sep. 22, 1993.

Rutherford, M. "Third Generation Digital Flight Controls," CAE Electronics, Ltd., The Royal Aeronautical Society, 1984 Spring Convention Future Applications and Prospects for Flight Simulation, May 9-10, 1984, paper No. 15.

Iwata, H., "Artificial Reality with Force-feedback: Development of Desktop Virtual Space with Compact Master Manipulator," Computer Graphics, vol. 24, No. 4, 1990, pp. 165-170.

Corrao, Joseph M., "Control Loading," American Institute of Aeronautics and Astronautic's Flight Simulation Update 1987, Jan. 12-16, 1987.

Kaczmarek et al., "Tactile Displays," Virtual Environment Technologies.

Ouhyoung et al., "The Development of A Low-Cost Force Feedback Joystick and Its Use in the Virtual Reality Environment," Proceedings of the Third Pacific Conference on Computer Graphics and Applications, Pacific Graphics '95, Seoul, Korea, Aug. 21-24, 1995.

Scannell, "Taking a Joystick Ride," Computer Currents, Boston Edition, vol. 9, No. 11, Nov. 1994.

* cited by examiner

METHOD AND APPARATUS FOR COMPENSATING FOR POSITION SLIP IN INTERFACE DEVICES

CROSS REFERENCE TO RELATED APPLICATIONS

This application is a continuation of U.S. patent application Ser. No. 09/570,157, filed May 11, 1999 now U.S. Pat. No. 6,903,721, issued Jun. 7, 2005 entitled "Method and Apparatus for Compensating for Position Slip in Interface Devices," and also claims priority to U.S. Provisional Patent No. 60/133,586, filed May 11, 1999 which is incorporated herein by reference in its entirety.

BACKGROUND OF THE INVENTION

The present invention relates generally to sensing techniques for human-computer interface devices.

Using an interface device, a user can interact with an environment displayed by a computer system to perform functions and tasks on the computer, such as playing a game, experiencing a simulation or virtual reality environment, using a computer aided design system, operating a graphical user interface (GUI), or otherwise influencing events or images depicted on the screen. Common human-computer interface devices used for such interaction include a joystick, mouse, trackball, steering wheel, stylus, tablet, pressure-sensitive ball, or the like, that is connected to the computer system controlling the displayed environment.

In some interface devices, haptic feedback is also provided to the user, also known as "force feedback." These types of interface devices can provide physical sensations which are felt by the user manipulating the physical object of the interface device. For example, the Force-FX joystick controller from CH Products, Inc. or the Wingman Force joystick from Logitech may be connected to a computer and provides forces to a user of the controller. Other systems might use a force feedback mouse controller. One or more motors or other actuators are used in the device and are connected to the controlling computer system. The computer system controls forces on the force feedback device in conjunction with and coordinated with displayed events and interactions on the host by sending control signals or commands to the force feedback device and the actuators.

In both force feedback devices and non-force feedback devices, it is important to accurately sense the position of the manipulandum moved by the user so that interactions displayed on the screen are accurately portrayed. Furthermore, the determination of forces in force feedback devices often depends on the position of the manipulandum so that accurate sensed position is critical for realistic force feedback.

Thus, all interface devices require some sort of position sensor (or sensors) in order to read the input position of the manipulandum ("end effector"). Sometimes the position sensors are connected directly to the end effector itself. However, in other cases the sensor is actually connected through a mechanical transmission to the end effector. For example, a gear transmission, capstan drive (cable) transmission, or belt drive transmission can be used. The purpose of the transmission, as far as the position sensor is concerned, is to amplify the range of motion that the sensor can detect and allow the use of lower resolution sensors, which are typically less expensive. A mechanical transmission may also be used to amplify forces output by the actuators of the force feedback device. The transmission for a sensor can be the same transmission as an actuator uses; several different joystick devices use this method, such as the device described in copending patent application Ser. No. 09/138,304, which provides a sensor connected to an actuator shaft. In other devices, an independent mechanical transmission dedicated to the sensor can be used.

In either of these cases, there is the possibility of position slip occurring in the transmission, where the end effector moves some distance without the sensor detecting that movement or inaccurately detecting that movement; e.g., a gear skips teeth, a belt or cable slips on a pulley, etc. When a relative position sensor is used in the device, such as a quadrature encoder, this position slip should be detected or the device will be unable to determine an accurate position for the end effector when slip occurs. The problem is amplified for force feedback devices because they often operate in a limited workspace and depend on the ability to determine the absolute device position in the limited workspace. Furthermore, some forces output by the device are based on an accurate position of the manipulandum, so that the forces can become discontinuous or distorted if position slip occurs.

SUMMARY OF INVENTION

The present invention provides a method and apparatus for compensating for position slip in interface devices that may occur between a manipulandum and a sensor of the device due to a mechanical transmission. More accurate sensing of manipulandum position and smooth display of controlled objects based on manipulandum position are achieved.

More specifically, a method for correcting for slippage in a position sensing system of an interface device coupled to a host computer includes determining a device position delta from a sensed position of a manipulandum of the interface device in a degree of freedom. The position delta indicates a change in position of the manipulandum. It is determined if position slip has occurred in the position sensing system, where the position slip is caused by a change in position of the manipulandum that was not sensed by a sensor of the interface device. The position slip is typically caused by a mechanical transmission provided between the sensor and manipulandum, such as a gear drive, a belt drive, and a capstan drive. If position slip has occurred, an error in the sensed position caused by the position slip is corrected by adjusting the sensed position to take into account the position slip. The adjusted position delta is used as the position of the manipulandum.

Preferably, the determining if the slip has occurred includes checking a reference signal from a reference sensor included on the interface device, the reference sensor detecting a position of a reference location coupled to the manipulandum. A computation value is preferably determined from the device position delta, where a display of the host computer is updated based on the computation value. In one method, the computation value is not adjusted with the device position delta when the position slip is detected, allowing smoother display of graphical objects. In some embodiments, a force having a magnitude and direction is determined at least partially based on the computation value, and where the force is output by an actuator included in the interface device. Preferably, the computation value is modified to compensate for an offset between device position and screen position that may occur due to the position slip and the adjustment of computation value. For example, a user-controlled object displayed by the host computer can be allowed to continue to be moved after the manipulandum has reached a limit to a workspace of the manipulandum, where the user-controlled object continues to be moved in a direction corresponding to a direction of the manipulandum into the limit.

In another method, the determining of a device position, determining if a position slip has occurred, and correcting an error are performed over several iterations, and the sensed position is adjusted or corrected by an amount which gradually reduces the error in the sensed position over those iterations. The adjusting of the sensed position in this fashion is preferably not performed if the manipulandum is not moving in the degree of freedom.

In another aspect of the present invention, an interface device provides input to a host computer based on manipulations of a user. The interface device includes a manipulandum physically contacted by the user and movable in at least one degree of freedom. A position sensor detects a position of the manipulandum in the degree of freedom. A mechanical transmission is coupled between the manipulandum and the position sensor, and a reference sensor detects the motion of at least one reference location coupled to the manipulandum, the reference sensor providing a reference signal used to determine if position slip has occurred between the manipulandum and position sensor. One or more actuators can be provided to output forces for force feedback devices. A local microprocessor can receive the reference signal and adjust the detected position of the manipulandum to compensate for the position slip. The local microprocessor can also determines a computation value from a position delta, where the computation value is adjusted if the position slip has occurred. The computation value provided to the host computer to update a display of the host computer and can be used to update output forces and other values.

The present invention advantageously provides a sensing system that takes advantage of the increased sensing resolution offered by the use of mechanical transmissions such as gear drives and belt drives, and yet accurately compensates for the inaccurate sensing that may occur when using such transmissions due to position slip.

These and other advantages of the present invention will become apparent to those skilled in the art upon a reading of the following specification of the invention and a study of the several figures of the drawing.

DETAILED DESCRIPTION OF PREFERRED EMBODIMENTS

Figure 1:
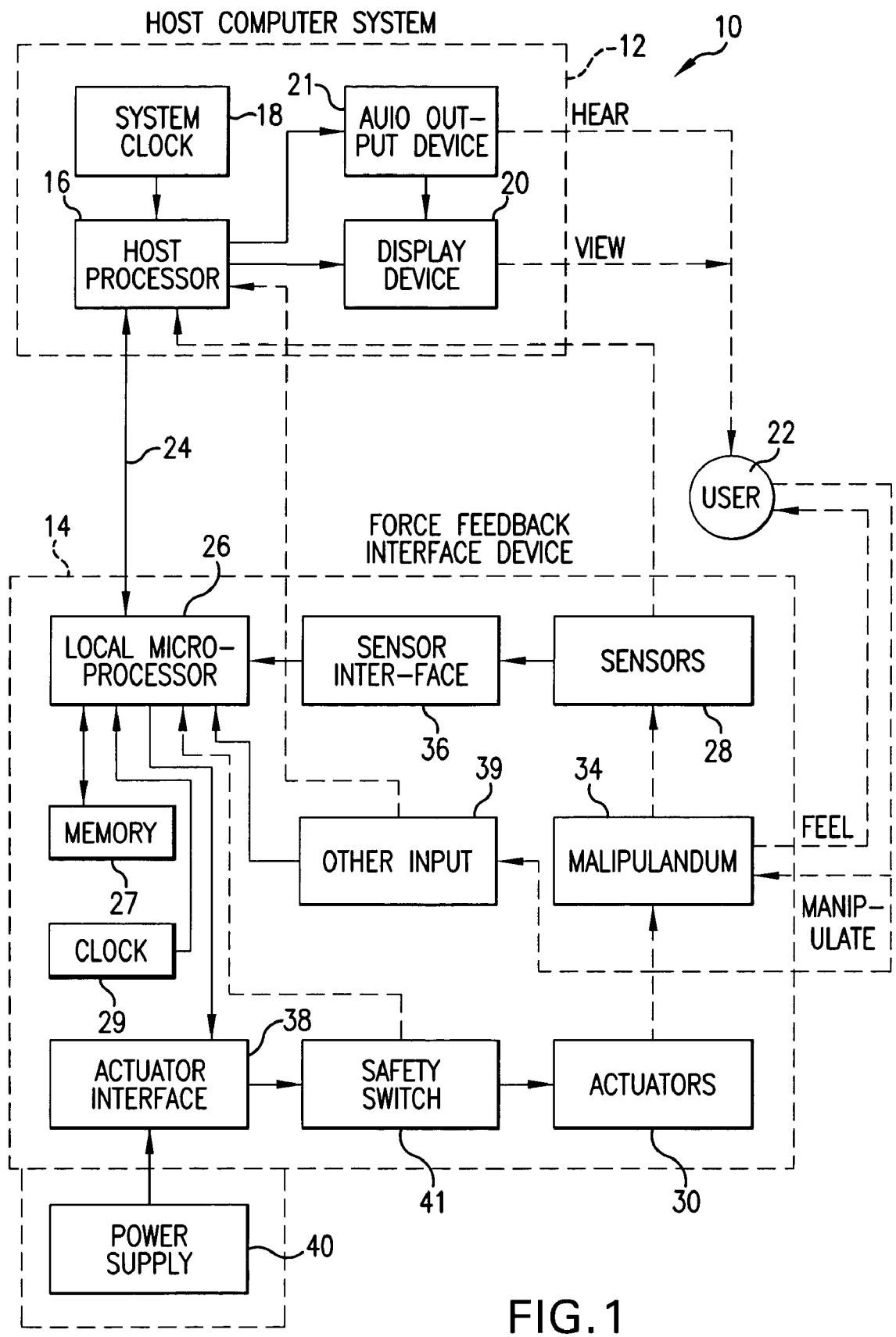
FIG. 1 is a block diagram of system including an interface device and host computer for use with the present invention.

FIG. 1 is a block diagram illustrating a force feedback interface system 10 suitable for use with the present invention controlled by a host computer system. Interface system 10 includes a host computer system 12 and an interface device 14.

Host computer system 12 can be a personal computer, such as an IBM-compatible or Macintosh personal computer, or a workstation, such as a SUN or Silicon Graphics workstation. Alternatively, host computer system 12 can be one of a variety of home video game systems, such as systems available from Nintendo, Sega, or Sony, a television "set top box" or a "network computer", etc. Host computer system 12 preferably implements a host application program with which a user 22 is interacting via peripherals and interface device 14. For example, the host application program can be a video or computer game, medical simulation, scientific analysis program, operating system, graphical user interface, or other application program that utilizes force feedback. Typically, the host application provides images to be displayed on a display output device, as described below, and/or other feedback, such as auditory signals.

Host computer system 12 preferably includes a host microprocessor 16, a clock 18, a display screen 20, and an audio output device 21. Microprocessor 16 can be one or more of any of well-known microprocessors. Random access memory (RAM), read-only memory (ROM), and input/output (I/O) electronics are preferably also included in the host computer. Display screen 20 can be used to display images generated by host computer system 12 or other computer systems, and can be a standard display screen, CRT, flat-panel display, 3-D goggles, or any other visual interface. Audio output device 21, such as speakers, is preferably coupled to host microprocessor 16 via amplifiers, filters, and other circuitry well known to those skilled in the art (e.g. in a sound card) and provides sound output to user 22 from the host computer 12. Other types of peripherals can also be coupled to host processor 16, such as storage devices (hard disk drive, CD ROM/DVD-ROM drive, floppy disk drive, etc.), printers, and other input and output devices. Data for implementing the interfaces of the present invention can be stored on computer readable media such as memory (RAM or ROM), a hard disk, a CD-ROM or DVD-ROM, etc.

An interface device 14 is coupled to host computer system 12 by a bidirectional bus 24. The bidirectional bus sends signals in either direction between host computer system 12 and the interface device. An interface port of host computer system 12, such as an RS232 or Universal Serial Bus (USB) serial interface port, parallel port, game port, etc., connects bus 24 to host computer system 12. Alternatively, a wireless communication link can be used.

Interface device 14 can include a local microprocessor 26, sensors 28, actuators 30, a user object 34, optional sensor interface 36, an optional actuator interface 38, and other optional input devices 39. Local microprocessor 26 is coupled to bus 24 and is considered local to interface device 14 and is dedicated to sensor I/O and force feedback (if provided) of interface device 14. Microprocessor 26 can be provided with software instructions to wait for commands or requests from computer host 12, decode the command or request, and handle/control input and output signals according to the command or request. In addition, processor 26 preferably operates independently of host computer 12 by reading sensor signals and, if appropriate, calculating appropriate forces in accordance with a host command. Suitable microprocessors for use as local microprocessor 26 include the MC68HC711E9 by Motorola, the PIC16C74 by Microchip, and the 82930AX by Intel Corp., for example. Microprocessor 26 can include one microprocessor chip, or multiple processors and/or co-processor chips, and/or digital signal processor (DSP) capability.

Microprocessor 26 can receive signals from sensors 28 and provide signals to actuators 30 of the interface device 14 in accordance with instructions provided by host computer 12 over bus 24. For example, in a preferred local control embodiment, host computer 12 provides high level supervisory commands to microprocessor 26 over bus 24, and microprocessor 26 manages low level force control loops to sensors and actuators in accordance with the high level commands and independently of the host computer 12. The force feedback system thus provides a host control loop of information and a local control loop of information in a distributed control system. This operation is described in greater detail in U.S. Pat. No. 5,734,373, incorporated herein by reference. Microprocessor 26 can also receive commands from any other input devices 39 included on interface apparatus 14, such as buttons, and provides appropriate signals to host computer 12 to indicate that the input information has been received and any information included in the input information. Local memory 27, such as RAM and/or ROM, is preferably coupled to microprocessor 26 in interface device 14 to store instructions for microprocessor 26 and store temporary and other data. In addition, a local clock 29 can be coupled to the microprocessor 26 to provide timing data.

Sensors 28 sense the position, motion, and/or other characteristics of a user object 34 of the interface device 14 along one or more degrees of freedom and provide signals to microprocessor 26 including information representative of those characteristics. Rotary or linear optical encoders, analog potentiometers, photodiode or photoresistor sensors, velocity sensors, acceleration sensors, strain gauge, or other types of sensors can be used. Sensors 28 provide an electrical signal to an optional sensor interface 36, which can be used to convert sensor signals to signals that can be interpreted by the microprocessor 26 and/or host computer system 12.

Actuators 30 can be included in some interface devices to transmit forces to manipulandum 34 or housing of the interface device 14 in one or more directions along one or more degrees of freedom in response to signals received from microprocessor 26. Actuators 30 can include two types: active actuators and passive actuators. Active actuators include linear current control motors, stepper motors, pneumatic/hydraulic active actuators, a torquer (motor with limited angular range), voice coil actuators, and other types of actuators that transmit a force to move an object. Passive actuators can also be used for actuators 30, such as magnetic particle brakes, friction brakes, or pneumatic/hydraulic passive actuators. Actuator interface 38 can be optionally connected between actuators 30 and microprocessor 26 to convert signals from microprocessor 26 into signals appropriate to drive actuators 30.

Other input devices 39 can optionally be included in interface device 14 and send input signals to microprocessor 26 or to host processor 16. Such input devices can include buttons, dials, switches, levers, or other mechanisms. For example, in embodiments where user object 34 is a joystick, other input devices can include one or more buttons provided, for example, on the joystick handle or base. Power supply 40 can optionally be coupled to actuator interface 38 and/or actuators 30 to provide electrical power. A safety switch 41 is optionally included in interface device 14 to provide a mechanism to deactivate actuators 30 for safety reasons.

Manipulandum ("end effector" or "user object") 34 is a physical object, device or article that may be grasped or otherwise contacted or controlled by a user and which is coupled to interface device 14. By "grasp", it is meant that users may releasably engage, contact, or grip a portion of the manipulandum in some fashion, such as by hand, with their fingertips, or even orally in the case of handicapped persons. The user 22 can manipulate and move the object along provided degrees of freedom to interface with the host application program the user is viewing on display screen 20. Manipulandum 34 can be a joystick, mouse, trackball, stylus (e.g. at the end of a linkage), steering wheel, sphere, medical instrument (laparoscope, catheter, etc.), pool cue (e.g. moving the cue through actuated rollers), hand grip, knob, button, or other object. Mechanisms which may be used to provide the degrees of freedom to the user object include gimbal mechanisms, slotted yoke mechanisms, flexure mechanisms, etc. Various embodiments of suitable mechanisms are described in U.S. Pat. Nos. 5,767,839, 5,721,566, 5,623,582, 5,805,140, 5,825,308, and patent application Ser. Nos. 08/965,720, 09/058,259, and 09/138,304, all incorporated herein by reference.

A mechanical transmission can be connected between the actuator and the manipulandum and/or between the sensor and the manipulandum. The invention described herein is most suitable for devices including a transmission between the sensor and the manipulandum, since the transmission typically causes the most position slip in the device. Mechanical transmissions can include belt drive transmissions, capstan (cable) drive transmissions, and gear transmissions, many of which are described in greater detail in the patents and patent applications incorporated above. Furthermore, other compliance issues that may occur are described in copending patent application Ser. No. 09/138,309, incorporated herein by reference.

Figure 2:
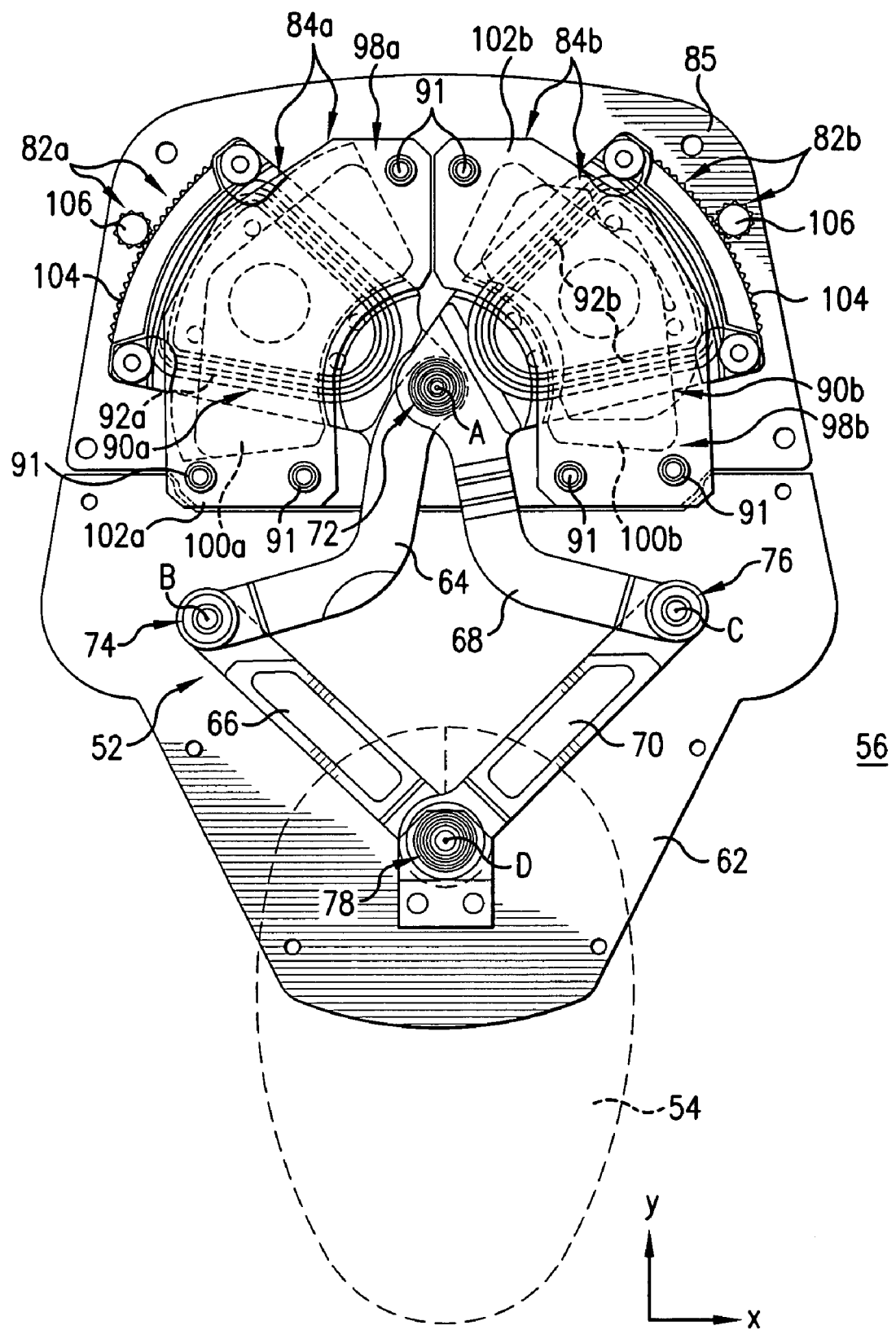
FIG. 2 is a top plan view of an example of a force feedback interface device suitable for use with the present invention.

FIG. 2 is a top plan view of one example of a interior portion 50 of a force feedback mouse interface device 14 that can make use of the present invention. Mouse 54 (shown in dashed lines) is the manipulandum 34 which the user grasps and moves in planar degrees of freedom, similar to a traditional mouse. A mouse device similar to mouse device 50 is described in copending application Ser. Nos. 08/881,691 and 08/965,720, both incorporated herein by reference. Unlike a traditional mouse, mouse 54 has hard limits to its motion in its planar workspace due to it being attached to the mechanical linkage, described below.

Mechanical linkage 52 provides support for a mouse 54 and couples the mouse to a grounded surface 56, such as a tabletop or other support. Linkage 60 is, in the described embodiment, a 5-member (or "5-bar") linkage including a ground member 62 (the base), a first base member 64 coupled to ground member 62, a second base member 68 coupled to ground member 62, a first link member 66 coupled to base member 64, and a second link member 70 coupled to link member 66 and base member 68. Mouse 54 is coupled to the linkage at the coupling between link members 66 and 70. Ground member 62 of the linkage 60 is a base for the support of the linkage and is coupled to or resting on ground surface 56. Fewer or greater numbers of members in the linkage can be provided in alternate embodiments.

The members of linkage 60 are rotatably coupled to one another through the use of rotatable pivots or bearing assemblies having one or more bearings, all referred to as "bearings" herein. Base member 64 is rotatably coupled to ground member 62 by a grounded bearing 72 and can rotate about an axis A. Link member 66 is rotatably coupled to base member 64 by bearing 74 and can rotate about a floating axis B, and base member 68 is rotatably coupled to ground member 62 by bearing 72 and can rotate about axis A. Link member 70 is rotatably coupled to base member 68 by bearing 76 and can rotate about floating axis C, and link member 70 is also rotatably coupled to link member 66 by bearing 78 such that link member 70 and link member 66 may rotate relative to each other about floating axis D. In an alternate embodiment, link member 66 can be coupled at its end to a mid-portion of link member 70 and mouse 54 can be coupled to the end of link member 70. Mouse 54 in the preferred embodiment is coupled to link members 66 and 70 by rotary bearing 78.

Linkage 60 is formed as a five-member closed-loop chain. Each member in the chain is rotatably coupled to two other members of the chain. The five-member linkage is a planar linkage that is arranged such that the members can rotate about their respective axes to provide mouse 54 with two degrees of freedom, i.e., mouse 54 can be moved within a planar workspace defined by the x-y plane, which is defined by the x- and y-axes.

Sensors 82a and 82b collectively sense the movement of the mouse 54 in the provided degrees of freedom and send appropriate signals to the electronic portion of interface device 14. Sensor 82a senses movement of link member 68 about axis A, and sensor 82b senses movement of base member 64 about axis A. These sensed positions about axis A allow the determination of the position of mouse 54 using known constants such as the lengths of the members of linkage 60 and using well-known coordinate transformations. Sensors 82, as described, use gear transmissions and thus can be subject to slip with respect to the manipulandum. The sensors are described in greater detail below with respect to FIG. 3.

Actuators 84a and 84b to transmit forces to mouse 54 in space, i.e., in two (or more) degrees of freedom of the user object. In the preferred embodiment, actuators 84a and 84b are electromagnetic voice coil actuators which provide force through the interaction of a current in a magnetic field. These types of actuators are described in detail in patent application Ser. Nos. 08/560,091, 08/881,691, and 08/965,720, all incorporated by reference herein. In other embodiments, other types of actuators can be used, both active and passive, such as DC motors, pneumatic motors, passive friction brakes, passive fluid-controlled brakes, etc.

The housing plate of a grounded portion of actuator 84a is rigidly coupled to ground member 62 (or grounded surface 56) and a moving portion of actuator 84a (preferably a coil) is integrated into the base member 64. The actuator 84a transmits rotational forces to base member 64 about axis A. The housing plate of the grounded portion of actuator 84b is rigidly coupled to ground member 62 or ground surface 56 through the grounded housing of actuator 84b, and a moving portion (preferably a coil) of actuator 84b is integrated into base member 68. Actuator 84b transmits rotational forces to link member 68 about axis A. The combination of these rotational forces about axis A allows forces to be transmitted to mouse 54 in all directions in the planar workspace provided by linkage 60 through the rotational interaction of the members of linkage 60.

Base member 64 includes an integrated coil portion 90a on which a wire coil 92a is provided. Wire coil 92a includes at least two loops of wire wound on a portion 90a, e.g. 222 loops, in the described embodiment, are wound like a spool about a center portion of portion 90a. Terminals (not shown) from wire coil 82a to the electronic portion of the interface device are provided so that host computer 18 or local microprocessor 26 can control the direction and/or magnitude of the current in wire coil.

Voice coil actuator 84a also includes a magnet assembly 98a, which is grounded and preferably includes four magnets 100a and a flux plate 102a. Opposite polarities of magnets 100 face each other, such that coil 92a is positioned between opposing polarities on either side of the coil. The magnetic flux guide surrounding the magnets is provided as, in the described embodiment, metal plate 102a provided on the top side of the magnets 100a and metal base plate 85 provided on the bottom side of the actuator 84a. Plates 102a and 85 house actuator 84a to allow magnetic flux from magnets 100a to travel from one end of the magnets 100a to the other end.

The magnetic fields from magnets 90a interact with a magnetic field produced from wire coil 82a when current is flowed in coil 82a, thereby producing forces on member 64. The magnitude or strength of the force is dependent on the magnitude of the current that is applied to the coil, the number of loops in the coil, and the magnetic field strength of the magnets. The direction of the force depends on the direction of the current in the coil; the force can be applied in either direction about axis A. Force can thus be applied to member 64 and through member 66, thereby applying force to mouse 54 in the x-y plane workspace of the mouse. Stop supports 91 can be provided at each end of the range of motion of the member 64 about axis A to provide a limited angular range.

Voice coil actuator 64b operates similarly to actuator 64a. A current is flowed through coil 82b to cause interaction with a magnetic field from magnets 100b of magnet assembly 98b which is similar to the magnet assembly 98a described above, and inducing magnetic forces that rotate portion 90b of base member 68 about axis A. This causes forces to be applied to mouse 54 in the x-y workspace of the mouse through the member 68 and member 70.

In alternate embodiments, the mechanical linkage 60 can be replaced by other mechanical linkages or structures which can provide desired degrees of freedom. For example, linear motion can be provided. In other embodiments, other types of actuators may be used in place of or in addition to actuators 84 of the interface device. For example, the linkage can be driven by a direct drive DC motor or a geared/belt DC motor to provide mechanical advantage.

Sensing Position Slip in Interface Devices

In some interface devices, slip may occur between the sensor and the manipulandum, where the manipulandum is moved and the sensor does not detect or detects inaccurately the movement of the manipulandum in one or more degrees of freedom of the manipulandum. Slip is often a greater problem when a mechanical transmission is provided between the sensor and the manipulandum. Mechanical transmissions are typically provided in such a configuration to amplify the motion of a moving sensor member (such as an encoder wheel) for a given amount of motion of the manipulandum, thereby increasing the sensing resolution of the sensor. Examples of such mechanical transmissions include gear drives, belt drives, and capstan drives.

Slip can cause problems in the display of graphical objects or interactions on a display screen of computer device, since the host computer controlling the display assumes the manipulandum is in a particular position when it may actually be in a different position; the difference is due to the slip. Furthermore, with respect to force feedback interface devices, many types of force sensations output by the device, such as spring forces, damping forces, attractive forces, texture forces, periodic forces activated based on position, etc., depend at least in part on the position of the manipulandum and can be distorted to varying degrees if slip occurs.

The present invention detects slip so as to reduce or eliminate these undesired effects. One aspect of the present invention for detecting the slip in a device uses a reference sensor (or "index sensor") that is connected directly to the manipulandum. In a simple case, this sensor can provide a digital flag signal that changes state when the manipulandum travels past a predetermined location (or one of several different locations) in its range of travel or workspace. The important aspect of the reference sensor is that it is connected to the manipulandum "before" any mechanical transmission, i.e. there is no transmission mechanism between the reference sensor and the manipulandum. It is therefore not possible to generate transmission-induced slippage between the manipulandum and the reference sensor. In general, there is preferably one reference sensor for each degree of freedom of the manipulandum that is sensed on the device.

One example of a reference sensor is an emitter/detector pair similar to those used in standard optical encoders. This sensor can be used, for example, to detect the edges of a "flag," e.g., a reference location such as a mark, edge, or other distinguishing feature, as it moves past the sensor position. Multiple flags can be used to generate several possible different index locations that are sensed during the motion of the manipulandum.

Figure 3:
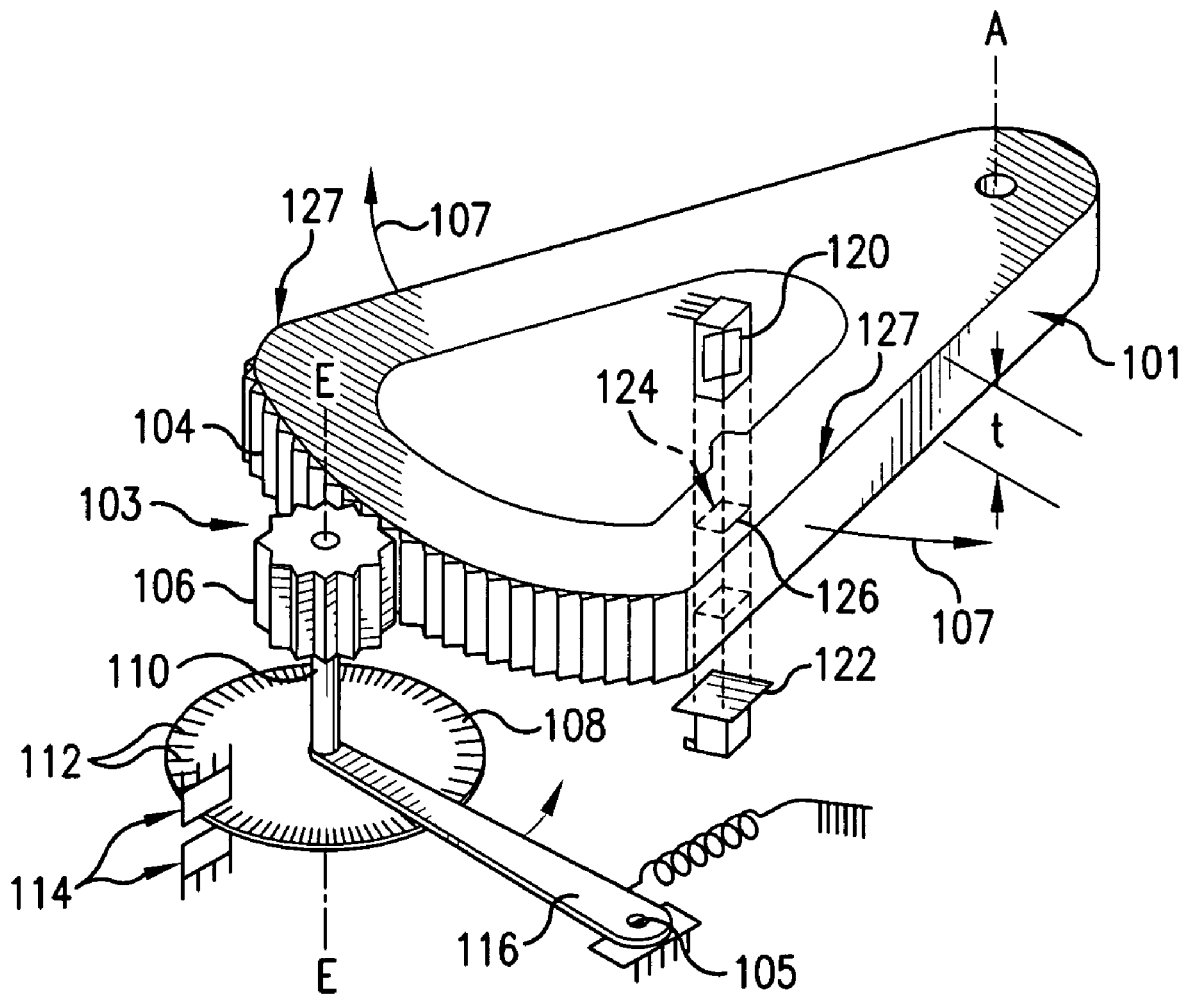
FIG. 3 is a perspective view of a reference sensor of the present invention for detecting position slip.

FIG. 3 is a perspective view illustrating one embodiment of the reference sensor of the present invention in use with the force feedback mouse embodiment shown in FIG. 2. A mechanical member 101 is directly connected to the manipulandum with no mechanical transmission positioned therebetween. Member 101, for example, is shown as the end of a mechanical member 64 or 68 of the force feedback mouse device shown in FIG. 2, in which a wire coil is coupled to the member to pass through a magnetic field and generate a force on the manipulandum. Member 101 rotates about an axis A as shown by arrows 107.

At one end of member 101 is sensor 62a or 62b as shown in FIG. 2, which includes a gear transmission mechanism 103. Mechanism 103 includes teeth 104 coupled to the member 101 and a gear 106 which-includes gear teeth about its circumferential surface that interlock with the teeth 104. When member 101 moves, gear 106 thus rotates about axis E. Gear 106 is rigidly coupled to an encoder disk 108 by a shaft 110, where the encoder disk includes a number of marks or slots 112 that rotate through one or more emitter-detectors 114. The emitter-detectors 114 sense the motion of member 101 by detecting the passage of the marks or slots ("counts"), as is well known to those skilled in the art. Gear 106 can be biased to engage the teeth 104 by a pivotable spring-loaded member 116 which presses the gear 106 to engage the teeth 104 and pivots about a grounded coupling 105.

A reference sensor of the present invention can take many forms. One embodiment provides a grounded emitter 120 and a grounded detector 122 positioned on opposite sides of the member 101 somewhere in the range of motion of the member, such as approximately in the center of the range of motion. The emitter 120 emits a beam 124 that is blocked by the member 101 from reaching the detector 122. An aperture 126 is placed in the member 101, the aperture extending the entire thickness t of the member and allowing the beam 124 to reach the detector 122 when the member 101 is in a position placing the aperture 126 directly in the path of the beam 124. Thus, the detector will detect a change in state (producing a signal edge) three times during a motion in a single direction, assuming the member 101 starts in a position completely outside the beam: when one (or either) outside edge or side 127 of the member 101 moves to block the beam, when a first-encountered physical edge of the aperture 126 allows the beam to be transmitted, and when the second-encountered physical edge of the aperture 126 again blocks the beam. In other embodiments, a different number of changes in state can be detected; for example, only the side of the member 101 need be detected.

Alternatively, other reference sensors can be used. For example, one or more members can be placed extending out from the member 101, where the extending members successively moves through an emitted horizontally-aligned beam of an optical sensor as the member 101 moves. Other types of optical sensors, such as phototransistor, photodiode, and photoresistor sensors, can be used. Magnetic sensors can also be used in some embodiments.

It should be noted that, in other embodiments, other types of interface devices can be used with the reference sensor of the present invention. For example, interface devices such as a joystick, trackball, rotatable cylinder, steering wheel, gamepad, or other types of mice can be used. For example, a joystick handle can include a member extending from its lower section which crosses a beam of an emitter-detector. The closer the sensor is positioned to the actual manipulandum, the more accurate is the reference position sensed as an indication of actual manipulandum position.

Figure 4:
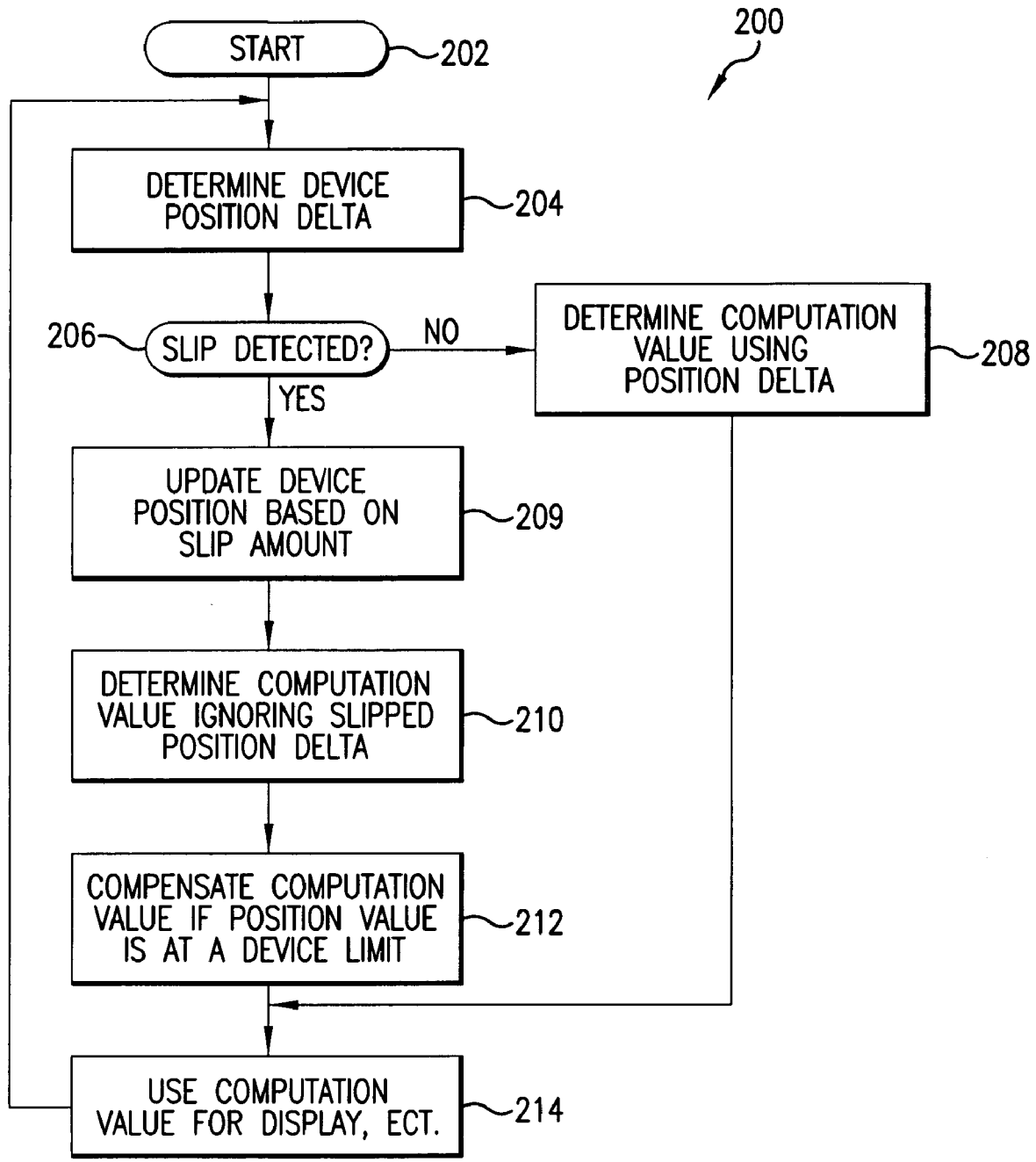
FIG. 4 is a flow diagram illustrating a first method of the present invention for compensating for position slip in interface devices.

FIG. 4 is a flow diagram illustrating a first method 200 of the present invention of sensing motion of a manipulandum of an interface device while compensating for slippage between sensor and manipulandum. This method can be performed by program code running on the local microprocessor, host computer, or other controlling device.

The process begins at step 202. In a step 204, a device position delta (change from the last position) is determined from the position sensor. This is obtained by reading a current device position and finding the difference between the current position and the last sensed device position. In step 206, the process checks whether a slip in position has been detected by using the reference sensor(s) described above. The details of determining if a slip has occurred are detailed below with respect to FIG. 5. This step also preferably provides the amount of slip that has occurred. If slip has not been detected, then in step 208 a computation value is determined using the position delta determined in step 204. The "computation value" is the position value that is used for displaying and computation purposes, e.g. by the host computer, as opposed to the device position value which is the position of the manipulandum in its workspace. For example, a computation value can be determined in one embodiment by simply adding the sensed position delta to the previously-used computation value to achieve the current computation value. Alternatively, the position delta can be factored into a more complicated computation value that depends also on other factors. For example, a ballistics algorithm can be used which determines a computation value based on factors such as the manipulandum velocity and the location of the manipulandum within its workspace. Some ballistics methods are described in greater detail in copending patent application Ser. No. 08/924,462, incorporated herein by reference. Once the computation value is determined, the process continues to step 214 where the host computer's display is updated based on the computation value, and other processes using the computation value can be performed (force computation, etc.). For example, if the computation value is determined by a device processor, the computation value can be sent to the host computer as a cursor location which updates the display of a cursor on the screen. Or, the motion of a displayed user-controlled entity or viewpoint in a game or simulation can be updated. The process then returns to step 204.

If slip has been detected in step 206, then in step 209 the device updates the device position value using the amount of slip detected in step 206, and uses this as the current device position. This corrected device position allows the device to accurately determine when, for example, the manipulandum hits a limit to its workspace. In step 210, the process determines the computation value without the use of the position delta resulting from the slip updating in step 209. The slipped position delta from step 209 has been corrected and may include a large jump in position, and it is not desired to update the display screen in accordance with this jump since such a jump can be disconcerting to the user. For example, in systems where the absolute position of the device is being used to position an object in a graphical environment having the same proportional dimensions, this discontinuity can be disconcerting for the user. If the manipulandum position is displayed graphically as a graphical object on the display screen, then a sudden jump in the displayed location of the graphical object will occur if the slippage is included in the computation value. Furthermore, if the manipulandum position is being used in force feedback embodiments for force computations, then a sudden, unexpected force change may occur that is noticeable to the user. Thus, the computation value in step 208 is determined without using the slippage position delta determined in step 209 to prevent any significant discontinuities from occurring in computation value and in the display. In a simple case, this means that the last-computed computation value is simply used again as the current computation value, i.e. the display does not change. The current device position is still saved to be used as the "last" device position in the next iteration so that the next determined position delta is determined correctly.

In next step 212, if the current position of the manipulandum indicates that the manipulandum is at a limit to its workspace, then the computation value should be compensated for this event. This compensation allows recovery of the situation in which the device position is at one of its limits and the computation position has not reached a limit value (such as the edge of the screen). In such a case, without compensation, the user would try to continue to move the cursor (or other object) towards the edge of the screen, but could not since the manipulandum has encountered a hard limit to its motion. This situation can happen more frequently if the slip described herein is present in the device, since the slip increases any offset between device position in its workspace and screen cursor position on the display screen. Furthermore, the display from the computation value used in step 210 may cause a greater offset. To mitigate this situation, the computation value can be modified to allow the user to continue to move the cursor when the manipulandum has reached a physical limit. For example, in one embodiment, rate control limits are provided, in which the user can move the mouse into a border region of its workspace; the amount of distance moved into the border region controls the rate of speed of motion of the cursor in a corresponding direction. In a different embodiment, once the device reaches a predetermined distance to a limit, the remaining distance the cursor must travel to reach a screen limit is determined and an appropriate scaling factor is applied to the motion of the cursor to allow it to reach the screen limit when the device limit is reached. These and other methods are described in greater detail in copending application Ser. No. 08/924,462, incorporated herein by reference.

In next step 214, the computation value is used to update the display of the host computer and update other processes (force computation, etc.). The process then returns to step 204.

Figure 5:
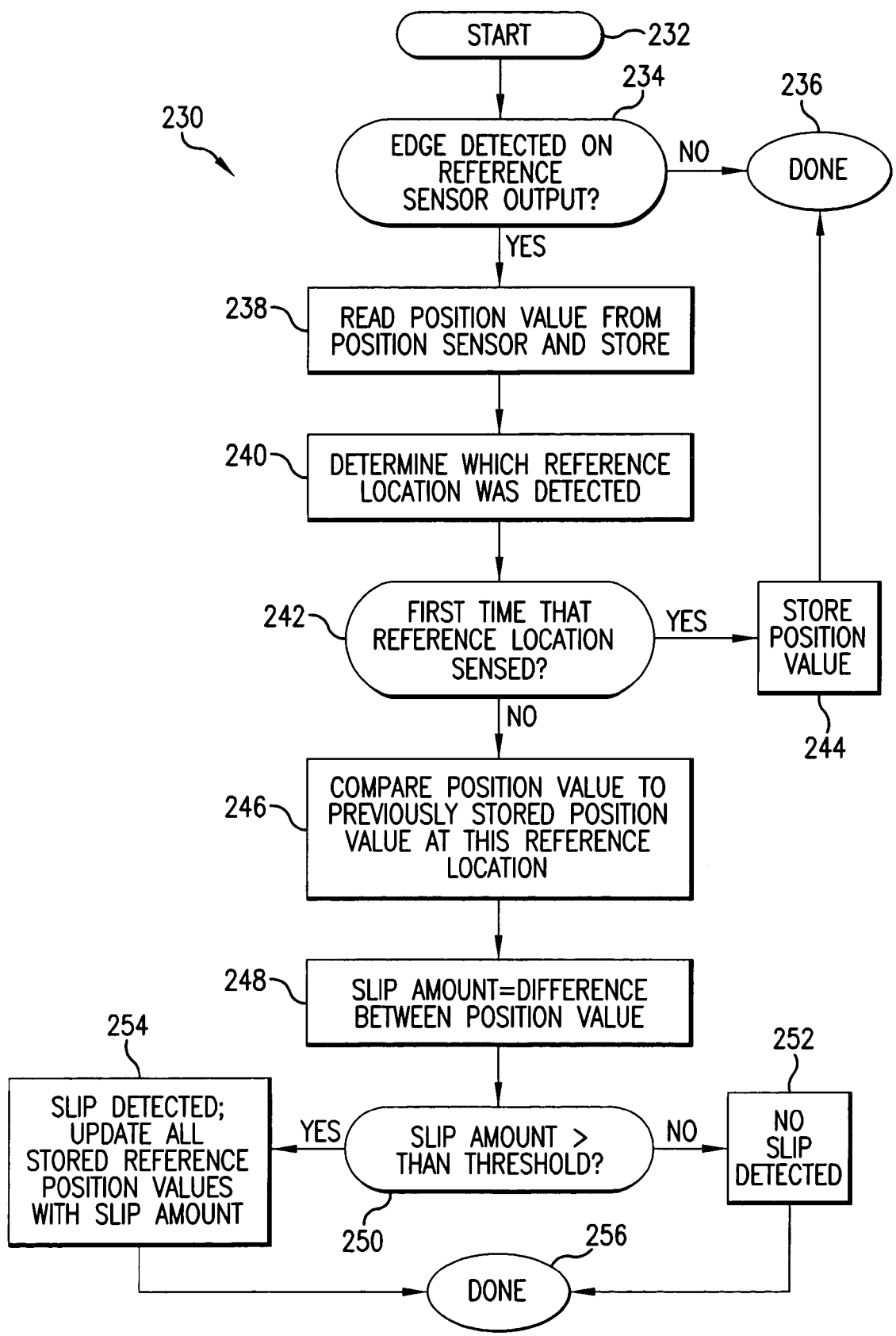
FIG. 5 is a flow diagram illustrating a method for detecting position slip and the amount of slip.

FIG. 5 is a flow diagram 230 illustrating the step 206 of FIG. 4 in which position slip is detected. The process begins at 232, and in step 234, the process checks whether a signal edge is detected in the output of the reference sensor. The signal edge indicates that the sensing of a flag or reference location has occurred. If no signal edge is sensed, then no reference location has been sensed, and the process is complete at 236. If a signal edge has been detected, then in step 238 the process immediately reads a position value that corresponds with the signal edge from the position sensor and stores this position value (or the device position read in step 204 of FIG. 4 can be used as the corresponding device position if it was read sufficiently close in time to the signal edge).

In step 240, the process determines which reference location in the range of motion of the member 101 is being sensed. For example, three different reference locations are sensed in the embodiment of FIG. 3, including one side of the member 101 and the two sides of the aperture 126. Each reference location is associated with a stored reference position value. To determine which of these reference locations was sensed, different methods can be used. In one method, the reference sensor can detect 2 different types of signal edges (rising or falling edge), and the process can use the information of which type of edge was detected to determine which reference location is being sensed. Thus, the first encountered reference location may produce a rising edge, the second location may produce a falling edge, and the third encountered location may produce a rising edge. The process can further examine the current direction of member 101 to help determine which reference location was sensed, e.g. the reference locations are encountered in a particular order depending on the direction of travel of the member 101.

In next step 242, the process checks if it is the first time that a reference location has been sensed. If it is the first time, then the position value read at step 238 is stored at step 244 to correspond to the identified reference location and the process is complete at 236. In addition, a determination of no slippage is assumed at this stage and returned to the main process of FIG. 4. Since there is only one position value known to correspond with the reference location, no comparison with previous positions at that location can be made, so that no slippage can be determined. In one preferred embodiment, a number of position values are stored for the first few times that signal edges are first detected before slippage is computed so that a stable, accurate reference location position is obtained. For example, the first position value that does not significantly deviate after five consecutive sensings is established as the position value for that reference location, and only after that position is established does the process check for slippage starting at step 246.

If it is not the first time that the reference location has been sensed (or the position value for that reference location is otherwise established), then in step 246 the process compares the current position value to the most recent, previously stored position value for this reference location. In step 248, the slip amount is determined as the difference between these position values. If the slip value is zero, then it indicates that no slippage has occurred. If the slip value is a nonzero value, then some slippage has occurred, since a single reference location has been sensed at a different position of member 101. In step 250, the process checks if the slip amount is greater than a predetermined threshold; this threshold should at least be larger than the possible variation in the reference sensor position produced by the sensor device being used. If the slip amount is less than the threshold, the slip amount is too low to be worth compensating, and no slip is considered to be detected at step 252. The process is then complete at 256. If the slip amount is greater than the threshold in step 250, then in step 254 then slip is considered to have been detected, and all stored reference position values are updated with the slip amount. Since slip has occurred and the reference locations are now being detected at a new position, the stored reference positions for those locations must be updated so that any additional slip can be detected if it occurs. For example, the position values corresponding to all three reference locations in the embodiment of FIG. 3 are all updated by adding the slip amount to each position value; this prevents the same slip from being detected again when the next reference position on member 101 is detected. The process is then complete at 256.

A special case exists when the mechanical transmission that is used in the device skips only in discrete units. An example of this case is a gear drive transmission, such as shown in FIG. 3. When a transmission such as this is employed, it is known that any slippage that occurs in the system will be equivalent to a change of one discrete unit of the transmission. In a geared system, this means that any observed slips will always be a certain number of gear teeth that have been jumped over. Since the number of position sensor counts that occur for each gear position is fixed (call this value N), all actual slip in the system will be in multiples of the value N. Since N is typically several sensor counts (when using a digital encoder sensor), this allows the detection of slip to be easier and the updating of reference position values to be more accurate.

Figure 6:
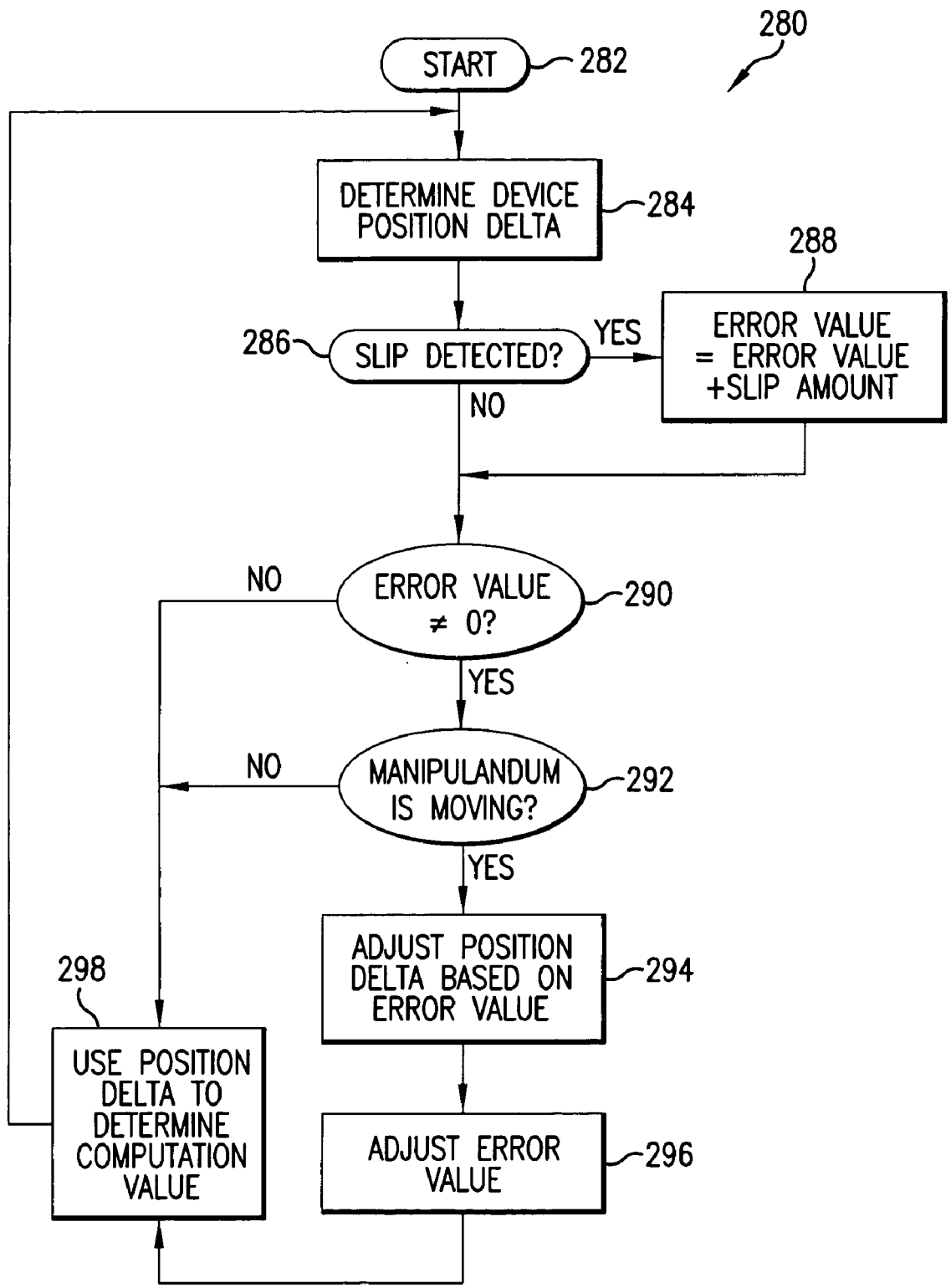
FIG. 6 is a flow diagram illustrating a second method of the present invention for compensating for position slip in interface devices.

FIG. 6 is a flow diagram illustrating a second method 280 of the present invention of sensing motion of a manipulandum of an interface device while compensating for slippage between sensor and manipulandum. In this method, slippage is not ignored for computation value purposes, so that the screen display is correlated with slipped device position smoothly and the offset between device position and screen display is corrected over time. Basically, small "corrections" are applied to the device position delta values in order to reduce slippage error. These corrections are then also subtracted out of the error value. This process is continued until the error values are reduced to zero and the actual manipulandum position matches the sensed manipulandum position. The result is that the computation value slowly approaches the correct value as the error values are reduced. This allows this second method to be used in embodiments that are not using rate control borders, scaling, or other methods that allow a user to continue to control a cursor after a device limit has been reached. This method can be more suitable for devices providing absolute position mapping with no great changes to computation position, such as in most joystick embodiments.

The process begins at 282, and in step 284, the process determines the device position delta, similar to step 204 of FIG. 4. In step 286, the process determines if slip has occurred, similar to step 206 of FIG. 4. If slip has occurred, then in step 288 an error value is set equal to the previous error value plus the current slip amount found in step 286 (the error value is initially set to zero upon device start-up). The error value is thus a total indication of slip that has occurred during device operation, including slip amounts from previous slippage occurrences and adjustments from manipulandum movement (described below). After step 288, or if no slip has been detected in step 286, then step 290 is performed, in which the process checks whether the error value is currently is nonzero. If not, i.e. if the error value is zero, then no slippage needs to be compensated for and in step 298 the position delta from step 284 is used to determine the computation value without correction. The computation value can then be used for display purposes, force computation purposes, etc. The process then returns to step 284.

If the error value is nonzero in step 290, then in step 292 the process checks whether the manipulandum or member 101) is moving. This check is performed so that computation value corrections do not cause disconcerting effects to the user that may occur if the manipulandum is not moving, e.g. the mouse may be stationary yet the cursor may be moving to correct for slippage. To avoid this, computation value corrections are preferably made only when the manipulandum is moving. Thus, if the manipulandum is moving in step 292, the process continues to step 298 to determine a computation value normally. If the manipulandum is moving, the process continues to step 294 to adjust the position delta (described below). In some embodiments, to allow computation value corrections when a device limit has been reached (and the manipulandum is stationary), a check can be made for the amount of time that the manipulandum has been stationary. For example, if the manipulandum is stationary for a predetermined number of iterations, then the manipulandum can be considered moving. A check can also be made whether the manipulandum is positioned at a device limit.

In step 294, the position delta determined in step 284 is adjusted based on the error value. This can be implemented in many ways. For example, in one embodiment, the position delta can be adjusted by adding or subtracting a predetermined number of counts (or other sensor measurement units) to the current device position, thereby changing the position delta, to compensate for the slippage. The number of counts is preferably small enough so that the adjustment is not easily noticed by the user. This may cause the slippage error to be fully corrected only after multiple iterations of the process 280, since the error value could be much larger than the adjustment made. However, such slow correction is desired to prevent the user from noticing the correction process.

Alternatively, the adjustment can be proportional to the size of the current error value, where larger error values cause larger adjustments (with a maximum limit to the size of the adjustment so that the user will not easily notice the adjustments). In some embodiments, each adjustment or correction in the loop of method 280 can depend on the current manipulandum position in its workspace. For example, if the manipulandum is moved by the user to an actual position that would increase the slippage amount (if the incorrect sensed position were held stationary), then a greater adjustment can be applied. If, however, the manipulandum is moved by the user to an actual position that would decrease the slippage amount (if the incorrect sensed position were held stationary), then a smaller correction can be applied, since the manipulandum motion is already helping to decrease the slippage error by being in the direction of decreasing the slippage delta.

After step 294, the process adjusts the error value by the amount of the adjustment made in step 294. Thus, if 10 counts were added to the position delta in step 294, the error value can be reduced by 10 counts. The process then continues to step 298 to determined a computation value that is based on the adjusted position delta. This allows the graphical display (and other computations based on device position) to be correlated with a device position that is slowly being corrected to remove slippage error. At some iteration, the error value has been reduced in size sufficiently so that the last adjustment at step 296 causes the error value to be zero, and slippage error has been eliminated from the system.

While this invention has been described in terms of several preferred embodiments, it is contemplated that alterations, permutations and equivalents thereof will become apparent to those skilled in the art upon a reading of the specification and study of the drawings. For example, many different types of interface devices, both force feedback and non-force feedback, may be used with the position sensing techniques described herein. Furthermore, certain terminology has been used for the purposes of descriptive clarity, and not to limit the present invention. It is therefore intended that the following appended claims include alterations, permutations, and equivalents as fall within the true spirit and scope of the present invention.

The invention claimed is:

1. A method comprising:
    determining a device position delta from a sensed position of a manipulandum of an interface device in a degree of freedom, said position delta indicating a change in an actual position of said manipulandum;
    determining if a position slip has occurred in a position sensing system, said position slip caused by a change in position of said manipulandum not sensed by a sensor of said interface device;
    correcting an error in said sensed position caused by said position slip by adjusting said sensed position to take into account said position slip, and using said adjusted position as said actual position of said manipulandum;

determining a computation value from said device position delta, and outputting said computation value; and determining a force having a magnitude and a direction at least partially based on said computation value, and outputting said force with an actuator disposed within said interface device.

2. A method comprising:

determining a device position delta from a sensed position of a manipulandum of an interface device in a degree of freedom, said position delta indicating a change in an actual position of said manipulandum;

determining if a position slip has occurred in a position sensing system, said position slip caused by a change in position of said manipulandum not sensed by a sensor of said interface device;

correcting an error in said sensed position caused by said position slip by adjusting said sensed position to take into account said position slip, and using said adjusted position as said actual position of said manipulandum; and performing said determining a device position, said determining if a position slip has occurred, and said correcting an error over a plurality of iterations, and adjusting said sensed position by an amount which gradually reduces said error in said sensed position over said plurality of iterations.

3. A method comprising:

determining a device position delta from a sensed position of a manipulandum of an interface device in a degree of freedom, said position delta indicating a change in an actual position of said manipulandum;

determining if a position slip has occurred in a position sensing system, said position slip caused by a change in position of said manipulandum not sensed by a sensor of said interface device;

correcting an error in said sensed position caused by said position slip by adjusting said sensed position to take into account said position slip, and using said adjusted position as said actual position of said manipulandum;

determining a computation value from said device position delta;

modifying said computation value to compensate for an offset between said device position and a screen position of an object displayed by a host computer; and outputting said computation value.

4. A method comprising:

determining a device position delta from a sensed position of a manipulandum of an interface device in a degree of freedom, said position delta indicating a change in an actual position of said manipulandum;

determining if a position slip has occurred in a position sensing system, said position slip caused by a change in position of said manipulandum not sensed by a sensor of said interface device;

correcting an error in said sensed position caused by said position slip by adjusting said sensed position to take into account said position slip, and using said adjusted position as said actual position of said manipulandum;

determining a computation value from said device position delta;

modifying said computation value to allow an object displayed by said host computer to continue moving after said manipulandum has reached a limit to a workspace of said manipulandum in a direction corresponding to a direction of said manipulandum into said limit; and outputting said computation value.

5. A device comprising:

a manipulandum movable in at least one degree of freedom;

a position sensor operative to detect a position of said manipulandum in at least one of said degrees of freedom;

a mechanical transmission coupled between said manipulandum and said position sensor; and a reference sensor operative to detect the motion of at least one reference location of said manipulandum, wherein at least one of said reference locations comprises a physical edge to a member, and wherein said reference sensor comprises an optical sensor operable to detect a passage of said physical edge through a transmitted beam.

6. A device comprising:

a manipulandum movable in at least one degree of freedom;

a position sensor operative to detect a position of said manipulandum in at least one of said degrees of freedom;

a mechanical transmission coupled between said manipulandum and said position sensor; and a reference sensor operative to detect the motion of at least one reference location of said manipulandum, wherein said reference sensor is operable to provide a rising signal edge or a falling signal edge in said reference signal.

7. A method comprising:

enabling a determination of a device position delta from a sensed position of a manipulandum of an interface device in a degree of freedom, said position delta indicating a change in an actual position of said manipulandum;

enabling a determination of whether a position slip has occurred in said position sensing system, said position slip caused by a change in position of said manipulandum that was not sensed by a sensor of said interface device, and wherein said determining if said position slip has occurred comprises checking a reference signal from a reference sensor coupled to said interface device, said reference sensor operable to detect a position of a reference location of to said manipulandum;

enabling a correction of an error in said sensed position caused by said position slip by adjusting said sensed position to take into account said position slip, and enabling said adjusted position to be provided as said actual position of said manipulandum; and performing said determining a device position, said determining if a position slip has occurred, and said correcting an error over a plurality of iterations, and adjusting said sensed position by an amount which gradually reduces said error in said sensed position over said plurality of iterations.

* * * * *